United States Patent Office 3,631,054
Patented Dec. 28, 1971

3,631,054
4-AROMATIC BICYCLO[2.2.2.]OCT-2-ENE-1-CARBOXYLIC ACIDS AND THEIR ESTERS
James C. Kauer, Wilmington, Del., assignor to E. I. du Pont de Nemours and Company, Wilmington, Del.
No Drawing. Continuation-in-part of abandoned application Ser. No. 650,595, July 3, 1967, which is a continuation-in-part of applications Ser. No. 460,812, June 2, 1965, and Ser. No. 377,132, June 22, 1964, both now abandoned. This application Jan. 22, 1970, Ser. No. 5,132
Int. Cl. C07d 31/34
U.S. Cl. 260—295 F
15 Claims

ABSTRACT OF THE DISCLOSURE 4-aromatic bicyclo[2.2.2]oct-2-ene-2-carboxylic acids and their esters which are prepared by the reaction of a 3,6-disubstituted α-pyrone and ethylene at elevated temperatures are useful as intermediates for the preparation of 4-aromatic bicyclo[2.2.2]octane-1-amines useful as anti-depressant.

CROSS-REFERENCE TO RELATED APPLICATIONS

This is a continuation-in-part of application Ser. No. 650,595, filed July 3, 1967, now abandoned, which was a continuation-in-part of applications Ser. Nos. 460,812, filed June 2, 1965, and 377,132, filed June 22, 1964, both now abandoned.

FIELD OF THE INVENTION

This invention relates to new bicyclo[2.2.2]octenes and to the preparation thereof.

SUMMARY OF THE INVENTION

This invention is directed to a compound of the formula

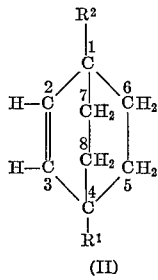

(II)

wherein one of $R^1$ or $R^2$ is a carboxy group (COOH) or a lower alkyl ester thereof (COOR$^3$ in which $R^3$ is lower alkyl, i.e., an alkyl of 1–4 carbon atoms); the other of $R^1$ or $R^2$ is an aromatic group of 6–10 carbon atoms; alternatively, but equivalently expressed, $R^1$ or $R^2$ are dissimilar and each is selected from the group consisting of carboxy or lower alkyl (of 1–4 carbon atoms) esters thereof, and aromatic groups of 6–10 carbon atoms.

The compounds of this invention are prepared by a process comprising the step of heating a compound of the formula

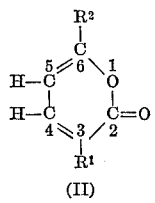

(II)

wherein one of the $R^1$ or $R^2$ substituents is a carboxy group or a lower alkyl ester thereof, i.e., a lower alkoxycarbonyl group, and the remaining $R^1$ or $R^2$ is an aromatic monoradical of 6 to 10 carbon atoms, which can be reacted with at least a stoichiometric quantity of ethylene at superatmospheric pressures and at temperatures of about 100–300° C. to yield 4-aromatic-substituted bicyclo [2.2.2]-oct-2-ene-1-carboxylic acids and lower alkyl esters thereof.

The compounds of this invention are useful as intermediates for the production of 4-aromatic-substituted bicyclo[2.2.2]octane-1-amines which are useful as anti-depressants.

DESCRIPTION OF THE PREFERRED EMBODIMENTS

The term "aromatic," as used throughout the present specification, includes carbocyclic and heterocyclic compounds that exhibit aromatic character. It is preferred for reasons of availability of the pyrone reactant and the uses for which the products may be employed that the cyclic moiety have 6 nuclear atoms, and that generally no more than 1 heteroatom be present in the ring. The aromatic monoradical is bonded to the bridgehead carbon atom through one of its nuclear carbon atoms and the total number of carbon atoms in the aromatic portion generally is not over 10. Preferably, the aromatic radical (either $R^1$ or $R^2$ of the preceding formulas) is: (a) phenyl, either unsubstituted or substituted with one or two substituents which can be selected from the following: lower alkyl (methyl, ethyl), halogen (chlorine, bromine, fluorine), lower alkoxy (methoxy, ethoxy), hydroxy, halogenated alkyl (trifluoromethyl), cyano, nitro, carboxy and lower alkoxycarbonyl (carbomethoxy, carbethoxy); (b) naphthyl, either unsubstituted or substituted with one of the following: lower alkyl, lower alkoxy, hydroxy, or chlorine; or (c) pyridyl, either unsubstituted or substituted with one of the following: lower alkyl (methyl, ethyl), halogen (chlorine, bromine, fluorine), halogenated alkyl (trifluoromethyl) and lower alkoxy (methoxy, ethoxy).

Specifically, preferred new compounds obtained by the process of this invention can be represented by the formulas

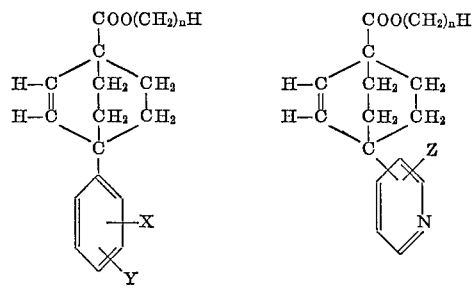

wherein $n$ is an integer from 0–4; X and Y in addition to H can be $CH_3$, $C_2H_5$, Cl, Br, F, $CF_3$, $NO_2$, $OCH_3$, $OC_2H_5$, CN, COOH, $COOCH_3$ and $COOC_2H_5$; and Z can be $CH_3$, $C_2H_5$, Cl, Br, F, $CF_3$, $OCH_3$ and $OC_2H_5$, in addition to H.

Preferred are those compounds wherein the bridgehead carbon other than that bearing the carboxyl group or its ester derivative has a phenyl or pyridyl substituent, the latter being attached through one of its nuclear carbon atoms.

This invention represents a great advance in the art by providing a one-step process for the direct preparation of bicyclooctenes from readily available starting materials. Although the reaction of ethylenically unsaturated compounds with a relatively stable, solid nuclear perhalogenated pyrone has been disclosed in the prior art (U.S. Pat. 3,092,641), the halogens on the nucleus impart properties which are substantially different from the properties of the products of this invention which employs a non-halogenated pyrone nucleus. Furthermore, in order to obtain the desired product with a halogen-free pyrone nucleus employing prior art teachings, a multi-step synthesis would be required.

The process of this invention generally requires pressure equipment since it is conducted at superatmospheric pressures. The exact pressure is dependent upon the compounds employed and can be as high as 5000 atmospheres and above. Generally, it is in the range of 50–3000 atmospheres and, preferably, in the range of 75–1000 atmospheres. The temperature used is generally 100–300° C. with temperatures of 125–275° C. being preferred. The time of reaction varies with the exact conditions employed. It generally is preferred to use lower temperatures with higher pressures at shorter reaction times. Generally reaction times of 0.5–24 hours are used with 10–20 hours being preferred. Since the reactants employed have carbon-to-carbon double bonds, hydroquinone, phenothiazine, or similar type of free radical inhibitor can be present in small (trace) amounts to prevent side reactions, especially polymerization.

The bicyclooctene carboxylates produced by this reaction are readily isolated by conventional means. Under normal room conditions, they are low-melting solids. They have low volatility. In the present invention, the carboxylates thus produced can be converted to the free carboxylic acids by conventional ester hydrolysis reactions such as aqueous sodium hydroxide saponification followed by acidification and isolation of the free carboxylic acid. Alternatively, of course, the free carboxylic acids can be prepared directly from the appropriate carboxy-substituted α-pyrone.

The following examples describe representative embodiments of the invention in greater detail.

EXAMPLE 1

Addition of ethylene to ethyl 6-phenyl-α-pyrone-3-carboxylate

A mixture of 60 g. of 6-phenyl-α-pyrone-3-carboxylic acid ethyl ester and 25 ml. of benzene was pressured to 1000 atmospheres with ethylene in a shaker tube and the temperature raised to 180° C. The tube pressure was then 3000 atmospheres. The tube was shaken at this temperature for 7 hours at which time the pressure had dropped to 2920 atmospheres. The tube was repressured to 3000 atmospheres with ethylene and the reaction continued for six hours.

The shaker tube was cooled and the contents discharged, diluted with 500 ml. of ethanol and filtered. The alcohol and benzene were distilled off leaving 57 g. of ethyl 4-phenylbicyclo[2.2.2]oct-2-ene-1-carboxylate as a white solid, M.P. 44–45.5° C.

Ethyl 6-phenyl-α-pyrone-3-carboxylate can be obtained by the method of Kochetkov et al., J. Gen. Chem. USSR (Eng. Tr.) 28, 1562 (1958); or as follows: A suspension of 14 g. of sodium hydride in 300 ml. of anhydrous dimethyl sulfoxide was stirred and warmed to 60–70° C. The evolution of hydrogen was measured with a wet test meter, and after the evolution was complete, the solution was cooled to 25° C. With stirring, 60.5 g. of acetophenone was added, followed by 108 g. of diethyl ethoxymethylenemalonate. During these additions, the temperature was kept at 20–25° C. by cooling with an ice bath.

The mixture was allowed to stand for 1 hour, and then poured onto ice containing 50 ml. of concentrated hydrochloric acid and 100 ml. of dichloromethane. The dichloromethane layer was separated and the water layer extracted three times with dichloromethane. The dichloromethane extracts were combined, dried with anhydrous magnesium sulfate, filtered, and the dichloromethane removed by vacuum evaporation to give 135 g. of brown oil. This was combined with 300 ml. of xylene and heated to reflux under a distillation column with a reflux head. Ethanol was removed as long as it formed. The xylene was then distilled at reduced pressure. Then, the mixture was heated at 125° C. and 0.3 mm., and all material which was volatile at this temperature distilled. The distillate was diluted with diethyl ether, whereon the product crystallized. It was filtered and dried to yield 35 g. of ethyl 6-phenyl-α-pyrone-3-carboxylate, M.P. 106–107° C.

EXAMPLE 2

Example 1 is repeated and the same product is obtained by employing ethyl 3-phenyl-α-pyrone-6-carboxylate (Van Dam, Trav. Chim. 83, 31 (1964)) instead of 6-phenyl-α-pyrone-3-carboxylic acid ethyl ester.

EXAMPLE 3

Ethyl 4-(4-pyridyl)bicyclo[2.2.2]oct-2-ene-1-carboxylate

A solution of 12 g. of ethyl 6-(4-pyridyl)-α-pyrone-3-carboxylate in 50 ml. of benzene was heated at 170° C. under ethylene at 3000 atm. for 15 hours in a shaker tube. The tube was cooled and vented through a trap cooled with solid carbon dioxide. The reaction mixture and trap contents dissolved in 1 liter of absolute ethanol and filtered to remove polymeric material. The ethanol was removed by vacuum evaporation to yield 10.2 g. of an oil which crystallized on standing to give a low-melting solid. This is 4-(4-pyridyl)bicyclo[2.2.2]oct-2-ene-1-carboxylic acid ethyl ester.

The ethyl 6-(4-pyridyl)-α-pyrone-3-carboxylate was obtained as follows:

A suspension of 14 g. of sodium hydride in 300 ml. of anhydrous dimethyl sulfoxide was stirred and warmed to 60–70° C. The evolution of hydrogen was measured with a wet test meter, and after the evolution was complete, the solution was cooled to 25° C. With stirring, 61.5 g. of 4-acetylpyridine was added, followed by 108 g. of diethyl ethoxymethylenemalonate. During these additions the temperature was kept at 20–25° C. by cooling with an ice bath.

The mixture was allowed to stand for 10–15 hours, and then poured onto 500 g. of ice containing 35 ml. of acetic acid. Water was added to bring the volume to 1500 ml. A dark red solid crystallized. This was filtered, washed with water, and dried.

The solid was suspended in xylene and heated to reflux under a distillation column with a reflux head. Ethanol was removed as long as it formed. The xylene was then removed at reduced pressure. Then, the flask contents were cooled, and allowed to crystallize. This crude material on recrystallization from toluene gave pure ethyl 6-(4-pyridyl)-α-pyrone-3-carboxylate, a yellow solid melting at 156–157° C.

The method of choice for preparing all three isomers of ethyl 6-pyridyl-α-pyrone-3-carboxylates involves the condensation of the appropriate acetylpyridine with diethyl ethoxymethylenemalonate in ethanol in the presence of sodium ethoxide. An intermediate sodium salt of the ketone is isolated. It has the structure:

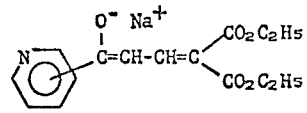

This salt is converted to the α-pyrone by adding it to liquid hydrogen fluoride or to methanesulfonic acid.

Using this technique, 6-(4-pyridyl)-α-pyrone-3-carboxylic acid ethyl ester, 6-(3-pyridyl)-α-pyrone-3-carboxylic acid ethyl ester, and 6-(2-pyridyl)-α-pyrone-3-carboxylic acid ethyl ester can be readily prepared. The preparation of the 3-pyridyl and the 2-pyridyl isomers is described below:

6-(3-pyridyl)-α-pyrone-3-carboxylic acid ethyl ester

A solution of sodium ethoxide, prepared from 23 g. of sodium in 500 ml. of ethanol in a nitrogen atmosphere, is stirred at 50–60° C., while a mixture of 121 g. of 3-acetylpyridine and 216 g. of diethyl ethoxymethylenemalonate is added during 10 minutes. The temperature rises about 10° C., and the solution becomes deep brown. The mixture is stirred and allowed to cool to room temperature as the sodium salt crystallizes. After two hours, the mixture is diluted with ether and filtered, and the solid is washed well with ether in a nitrogen atmosphere. The yield of dry orange-brown salt is 271 g.

One liter of liquid hydrogen fluoride is stirred in a polyethylene container and cooled in a solid carbon dioxide acetone bath. Nitrogen is kept over the liquid, while the above salt is added in small portions. The hydrogen fluoride is evaporated in a nitrogen stream for two days. The residue is then diluted with two liters of ice and water, and one liter of triethylamine is added along with ice until the solution is basic. The product separates as crystals and is extracted into chloroform. The chloroform is dried over sodium sulfate and concentrated to give 190 g. of a somewhat oily solid. This is pulped with ether, filtered and washed three times with enough ether to wet it well. The yield is 142 g., M.P. 147–149° C. This can be crystallized from ethyl acetate to give a product melting 148–149° C.

6-(2-pyridyl)-α-pyrone-3-carboxylic acid ether ester

A solution of 4.6 g. of sodium metal in 300 ml. of absolute ethanol is stirred, while a mixture of 50 g. diethyl ethoxymethylenemalonate and 24.2 g. of 2-acetylpyridine is added. After about 15 minutes, crystals of a yellow-orange solid begin to separate. The mixture is stirred for one hour and filtered, then washed with ethanol and ether. The yield is 46.5 g.

A 24.1 g. portion of the above salt is added to 219 g. of methanesulfonic acid while cooling to keep the temperature between 10–25° C. After stirring for 2 hours, the mixture is poured into one liter of absolute ethanol cooled in a solid carbon dioxide bath. While maintaining the cooling, 330 ml. of triethylamine is added. The resulting mixture is then poured into 3 l. of ice and water, extracted four times with dichloromethane, dried over magnesium sulfate, and concentrated to give a semi-solid oil, which is diluted with cold ethanol and filtered to give 5.6 g. of the crude product. This is recrystallized from 8 ml. of ethanol to give 5.0 g., M.P. 121–122° C.

EXAMPLE 4

Ethyl 4-(4-methoxyphenyl)bicyclo[2.2.2]-oct-2-ene-1-carboxylate

A pressure reaction vessel is charged with 54.8 g. (0.20 mole) of 3-carboethoxy-6-(4-methoxyphenyl)-2-pyrone and 200 ml. of benzene. The vessel is heated to 200° C. and ethylene is introduced to maintain the internal pressure at 1000 atmospheres for 16 hours. The vessel is cooled and the pressure is released. The contents are concentrated under vacuum to yield 56.2 g. of ethyl 4-(4-methoxyphenyl)bicyclo-[2.2.2]oct-2-ene - 1 - carboxylate. The purified material melts at 58–59° C.

3-carboethoxy-6-(4-methoxyphenyl)-2-pyrone was obtained as follows:

A 50.6 g. (2.2 moles) quantity of sodium is dissolved in 2000 ml. of absolute ethanol. A mixture of 300 g. (2.0 moles) of p-methoxyacetophenone and 432 g. (2.0 moles) of diethylethoxymethylenemalonate is slowly added to the ethanol solution. The reaction mixture is refluxed for 2 hours. At the end of this period, about 1300 ml. of ethanol is distilled off, and the mixture is cooled. A 1-liter portion of diethyl ether is added to the mixture, and the yellow precipitate is collected by filtration and is air dried. The yellow solid is dissolved in 2 liters of anhydrous hydrogen fluoride contained in a polyethylene bottle. The hydrogen fluoride is allowed to evaporate at room temperature under a stream of nitrogen. The residue is dissolved in methylene chloride and washed with water. The washed methylene extract is dried over anhydrous magnesium sulfate, filtered off and the dried filtrate is concentrated to dryness. The residue is recrystallized from ethyl acetate to give 208 g. (38%) of 3-carboethoxy-6-(4-methoxyphenyl)-2-pyrone as brilliant yellow crystals melting between 112–114° C.

Calc. for $C_{15}H_{14}O_5$ (percent): C, 65.69; H, 5.15. Found (percent): C, 65.65; H, 5.20.

EXAMPLE 5

4-(4-methoxyphenyl)bicyclo[2.2.2]oct-2-ene-1-carboxylic acid

A mixture of 120 g. (0.42 mole) of ethyl 4-(4-methoxyphenyl)bicyclo[2.2.2]oct - 2 - ene-1-carboxylate, 40 g. (1 mole) of sodium hydroxide and 400 ml. of diethylene glycol is heated to 135° C. for 2 hours, cooled, and poured into 1200 ml. of 6 N hydrochloric acid. The resultant precipitate was filtered off, washed with water and dried at 60° C. for 3 days to give 100 g. of yellow crystals melting between 234 and 243° C. The sample is recrystallized from acetic acid to yield 84.3 g. (78%) of crystals melting between 245.5 and 247° C.

Calc. for $C_{16}H_{18}O_3$ (percent): C, 74.39; H, 7.02. Found (percent): C, 74.34; H, 7.04.

EXAMPLE 6

Ethyl 4-(4-hydroxyphenyl)bicyclo[2.2.2]oct-2-ene-1-carboxylate 3-carboethoxy-6-(4-hydroxyphenyl) - 2 - pyrone is prepared by substituting 272 g. (2.0 moles) of p-hydroxyacetophenone for p-methoxyacetophenone in the procedure of Example 4. The reaction of 3-carboethoxy-6-(4-hydroxyphenyl)-2-pyrone with ethylene in the procedure of Example 4 gives ethyl 4-(4-hydroxyphenyl)bicyclo[2.2.2]oct-2-ene-1-carboxylate.

EXAMPLE 7

Ethyl 4-(4-ethoxyphenyl)bicyclo[2.2.2]oct-2-ene-1-carboxylate 3-carboethoxy - 6 - (4-ethoxyphenyl)-2-pyrone is prepared by substituting 328 g. (2.0 moles) of p-ethoxyacetophenone for p-methoxyacetophenone in the procedure of Example 4. The reaction of 3-carboethoxy-6-(4-ethoxyphenyl)-2-pyrone with ethylene in the procedure of Example 4 gives ethyl 4-(4 - ethoxyphenyl)bicyclo[2.2.2]oct-2-ene-carboxylate.

EXAMPLE 8

4-(4-ethoxyphenyl)bicyclo[2.2.2]oct - 2-ene-1-carboxylic acid and 4-(4-hydroxyphenyl)bicyclo[2.2.2]oct - 2 - ene-1-carboxylic acid A 126 g. quality of ethyl 4-(4-ethoxyphenyl)bicyclo [2.2.2]oct-2-ene-1-carboxylate is substituted for ethyl 4-(4-methoxyphenyl)bicyclo[2.2.2]oct - 2-ene-1-carboxylate in Example 5 to prepare 4-(4-ethoxyphenyl)bicyclo[2.2.2] oct-2-ene - 1-carboxylic acid. 4-(4-hydroxyphenyl)-bicyclo [2.2.2]oct-2-ene - 1 - carboxylic acid is prepared by substituting 114 g. of ethyl 4-(4-hydroxyphenyl)bicyclo[2.2.2] oct-2-ene-1-carboxylate for ethyl 4-(4 - methoxyphenyl)-bicyclo[2.2.2]oct-2-ene-1-carboxylate in Example 5.

EXAMPLE 9

Methyl 4-(4-hydroxyphenyl)bicyclo[2.2.2]oct-2-ene-1-carboxylate

A 500 ml. flask is fitted with a Soxhlet extractor. An extraction cup containing Linde® molecular sieves –5A, 1/16″ is placed in the extractor. The flask is charged with 11.2 g. (0.046 mole) of 4-(4-hydroxyphenyl)bicyclo

[2.2.2]oct-2-ene-1-carboxylic acid, 250 ml. of methanol and 0.5 g. of p-toluenesulfonic acid. The mixture is refluxed overnight, and is then cooled. The excess methanol is removed by distillation. The residue is dissolved in methylene chloride, washed with sodium bicarbonate solution and dried over anhydrous magnesium sulfate. The methylene chloride solution is removed by evaporation to yield methyl 4-(4-hydroxyphenyl)bicyclo[2.2.2]oct-2-ene-1-carboxylate.

EXAMPLE 10

Methyl 4-(4-methoxyphenyl)bicyclo[2.2.2]oct - 2 - ene-1-carboxylate and methyl 4-(4-ethoxyphenyl)bicyclo[2.2.2]oct-2-ene-1-carboxylate An 11.8 g. quantity of 4-(4-methoxyphenyl)bicyclo[2.2.2]oct-2-ene-1-carboxylic acid is substituted for 4-(4-hydroxyphenyl)bicyclo[2.2.2]oct-2-ene - 1 - carboxylic acid in Example IX to prepare methyl 4-(4-methoxyphenyl)bicyclo[2.2.2]oct-2-ene-1-carboxylate. Methyl 4-(4-ethoxyphenyl)bicyclo[2.2.2]oct - 2 - ene-1-carboxylate is prepared by substituting 12.5 g. of 4-(4-ethoxyphenyl)bicyclo[2.2.2]oct-2-ene-1-carboxylic acid for 4-(4-hydroxyphenyl)bicyclo[2.2.2]oct - 2 - ene-1-carboxylic acid in Example 9.

EXAMPLE 11

Ethyl 4-(4-ethoxyphenyl)bicyclo[2.2.2]oct-2-ene - 1 -carboxylate and ethyl 4-(4-hydroxyphenyl)bicyclo[2.2.2]oct-2-ene-1-carboxylate A 12.5 g. quantity of 4-(4-ethoxyphenyl)bicyclo[2.2.2]oct-2-ene-1-carboxylic acid is substituted for 4-(4-hydroxyphenyl)bicyclo[2.2.2]oct - 2 - ene-1-carboxylic acid and 250 ml. of ethanol for the methanol in Example 9, prepare ethyl 4-(4-ethoxyphenyl)bicyclo[2.2.2]oct-2-ene-1-carboxylate. Ethyl 4-(4-hydroxyphenyl)bicyclo[2.2.2]oct-2-ene-1-carboxylate is prepared by substituting 250 ml. of ethanol for the methanol in Example 9.

The following additional specific aromatically substituted bicyclo[2.2.2]oct-2-ene-1-carboxylic acids and esters are obtained when ethylene and the appropriate α-pyrone having the requisite aromatic substituent are reacted by the process described hereinabove. Where the product is shown as a carboxylic acid, it is obtained by a conventional ester hydrolysis procedure, or else directly from the appropriate carboxy-substituted α-pyrone.

4-(p-tolyl)bicyclo[2.2.2]oct-2-ene-1-carboxylic acid
4-(p-ethylphenyl)bicyclo[2.2.2]oct-2-ene-1-carboxylic acid
4-(p-fluorophenyl)bicyclo[2.2.2]oct-2-ene-1-carboxylic acid
4-(p-chlorophenyl)bicyclo[2.2.2]oct-2-ene-1-carboxylic acid
4-(p-bromophenyl)bicyclo[2.2.2]oct-2-ene-1-carboxylic acid
4-(p-nitrophenyl)bicyclo[2.2.2]oct-2-ene-1-carboxylic acid
4-(p-cyanophenyl)bicyclo[2.2.2]oct-2-ene-1-carboxylic acid
4-(p-trifluoromethylphenyl)bicyclo[2.2.2]oct-2-ene-1-carboxylic acid
4-(p-methoxyphenyl)bicyclo[2.2.2]oct-2-ene-1-carboxylic acid
4-(p-methoxycarbonylphenyl)bicyclo[2.2.2]oct-2-ene-1-carboxylic acid
4-(p-ethoxycarbonylphenyl)bicyclo[2.2.2]oct-2-en-1-carboxylic acid
4-(m-tolyl)bicyclo[2.2.2]oct-2-ene-1-carboxylic acid
4-(m-fluorophenyl)bicyclo[2.2.2]oct-2-ene-1-carboxylic acid
4-(m-chlorophenyl)bicyclo[2.2.2]oct-2-ene-1-carboxylic acid
4-(m-bromophenyl)bicyclo[2.2.2]oct-2-ene-1-carboxylic acid
4-(m-nitrophenyl)bicyclo[2.2.2]oct-2-ene-1-carboxylic acid
4-(m-methoxyphenyl)bicyclo[2.2.2]oct-2-ene 1-carboxylic acid
4-(m-methoxycarbonylphenyl)bicyclo[2.2.2]oct-2-ene-1-carboxylic acid
4-(m-ethoxycarbonylphenyl)bicyclo[2.2.2]oct-2-ene-1-carboxylic acid
4-(m-trifluoromethylphenyl)bicyclo[2.2.2]oct-2-ene-1-carboxylic acid
4-(o-tolyl)bicyclo[2.2.2]oct-2-ene-1-carboxylic acid
4-(o-fluorophenyl)bicyclo[2.2.2]oct-2-ene-1-carboxylic acid
4-(o-chlorophenyl)bicyclo[2.2.2]oct-2-ene-1-carboxylic acid
4-(o-bromophenyl)bicyclo[2.2.2]oct-2-ene-1-carboxylic acid
4-(o-nitrophenyl)bicyclo[2.2.2]oct-2-ene-1-carboxylic acid
4-(2,4-dimethylphenyl)bicyclo[2.2.2]oct-2-ene-1-carboxylic acid
4-(3,5-dimethylphenyl)bicyclo[2.2.2]oct-2-ene-carboxylic acid
4-(3,4-dimethoxyphenyl)bicyclo[2.2.2]oct-2-ene-1-carboxylic acid
4-(3-bromo-4-methoxyphenyl)bicyclo[2.2.2]oct-2-ene-1-carboxylic acid
4-(3-nitro-4-methoxyphenyl)bicyclo[2.2.2]oct-2-ene-1-carboxylic acid
Ethyl 4-p-ethylphenylbicyclo[2.2.2]oct-2-ene-1-carboxylate
4-(2,6-dimethylphenyl)bicyclo[2.2.2]oct-2-ene-1-carboxylic acid
4-(4-ethyl-2-methylphenyl)bicyclo[2.2.2]oct-2-ene-1-carboxylic acid
4-(2,4-diethylphenyl)bicyclo[2.2.2]oct-2-ene-1-carboxylic acid
4-o-trifluoromethylphenylbicyclo[2.2.2]oct-2-ene-1-carboxylic acid
4-p-hydroxyphenylbicyclo[2.2.2]oct-2-ene-1-carboxylic acid
Methyl 4-p-methoxyphenylbicyclo[2.2.2]oct-2-ene-1-carboxylate
Ethyl 4-p-ethoxyphenylbicyclo[2.2.2]oct-2-ene-1-carboxylate
4-(2,4-difluorophenyl)bicyclo[2.2.2]oct-2-ene-1-carboxylic acid
4-(2-chloro-4-fluorophenyl)bicyclo[2.2.2]oct-2-ene-1-carboxylic acid
4-(4-fluoro-2-trifluoromethylphenyl)bicyclo[2.2.2]oct-2-ene-1-carboxylic acid
4-(2,4-dimethoxyphenyl)bicyclo[2.2.2]oct-2-ene-1-carboxylic acid
4-(2,4-dinitrophenyl)bicyclo[2.2.2]oct-2-ene-1-carboxylic acid
4-(2,4-dihydroxyphenyl)bicyclo[2.2.2]oct-2-ene-1-carboxylic acid
4-(4-hydroxy-2-methylphenyl)bicyclo[2.2.2]oct-2-ene-1-carboxylic acid
Ethyl 4-[4-(3-fluoropyridyl)]bicyclo[2.2.2]oct-2-ene-1-carboxylate
Ethyl 4-[4-(2-trifluoromethylpyridyl)]bicyclo[2.2.2]oct-2-ene-1-carboxylate
Ethyl 4-[2-(3-methoxypyridyl)]bicyclo[2.2.2]oct-2-ene-1-carboxylate
Ethyl 4-[3-(5-ethoxypyridyl)]bicyclo[2.2.2]oct-2-ene-1-carboxylate
Methyl 4-(2-pyridyl)bicyclo[2.2.2]oct-2-ene-1-carboxylate
Ethyl 4-(3-pyridyl)bicyclo[2.2.2]oct-2-ene-1-carboxylate
Methyl 4-(4-pyridyl)bicyclo[2.2.2]octene-1-carboxylate
4-(3-pyridyl)bicyclo[2.2.2]octene-1-carboxylic acid
4-(5-ethyl-2-pyridyl)bicyclo[2.2.2]oct-2-ene-1-carboxylic acid 4-(3-chloro-4-pyridyl)bicyclo[2.2.2]oct-
2-ene-1-carboxylic acid
4-(5-chloro-2-pyridyl)bicyclo[2.2.2]oct-2-ene
1-carboxylic acid
4-(3-bromo-4-pyridyl)bicyclo[2.2.2]oct-2-ene-
1-carboxylic acid
4-(3-fluoro-4-pyridyl)bicyclo[2.2.2]oct-2-ene-
1-carboxylic acid
4-(3-fluoro-2-pyridyl)bicyclo[2.2.2]oct-2-ene-
1-carboxylic acid
4-(6-fluoro-3-pyridyl)bicyclo[2.2.2]oct-2-ene-
1-carboxylic acid
4-(3-trifluoromethyl-4-pyridyl)bicyclo[2.2.2]
oct-2-ene-1-carboxylic acid
4-(6-trifluoromethyl-3-pyridyl)bicyclo[2.2.2]
oct-2-ene-1-carboxylic acid
4-(2-methoxy-4-pyridyl)bicyclo[2.2.2]oct-
2-ene-1-carboxylic acid
4-(5-methoxy-2-pyridyl)bicyclo[2.2.2]oct-2-ene-
1-carboxylic acid
4-(6-methoxy-3-pyridyl)bicyclo[2.2.2]oct-2-ene-
1-carboxylic acid
4-(2-ethoxy-4-pyridyl)bicyclo[2.2.2]oct-2-ene-
1-carboxylic acid
4-(3-ethoxy-4-pyridyl)bicyclo[2.2.2]oct-2-ene-
1-carboxylic acid
4-(5-ethoxy-2-pyridyl)bicyclo[2.2.2]
oct-2-ene-1-carboxylic acid
4-(6-ethoxy-3-pyridyl)bicyclo[2.2.2]oct-2-ene-
1-carboxylic acid
4-(1-naphthyl)bicyclo[2.2.2]oct-2-ene-carboxylic acid
4-(2-naphthyl)bicyclo[2.2.2]oct-2-ene-carboxylic acid
4-(4-methoxy-1-naphthyl)bicyclo[2.2.2]
oct-2-ene-carboxylic acid
4-(4-chloro-1-naphthyl)bicyclo[2.2.2]oct-2-ene-
carboxylic acid
4-(4-methyl-2-naphthyl)bicyclo[2.2.2]
oct-2-ene-carboxylic acid
4-(4-hydroxyl-1-naphthyl)bicyclo[2.2.2]oct-2-ene-
carboxylic acid
methyl 4-(1-naphthyl)bicyclo[2.2.2]oct-2-ene-
carboxylate
ethyl 4-(2-naphthyl)bicyclo[2.2.2]oct-2-ene-carboxylate
methyl 4-(4-methoxy-1-naphthyl)bicyclo[2.2.2]
oct-2-ene-carboxylate
n-butyl 4-(4-chloro-1-naphthyl)bicyclo[2.2.2]
oct-2-ene-carboxylate
n-propyl 4-(4-methyl-2-naphthyl)bicyclo[2.2.2]
oct-2-ene-carboxylate
ethyl 4-(4-hydroxy-1-naphthyl)bicyclo[2.2.2]
oct-2-ene-carboxylate As indicated above, the preceding compounds are obtained by reaction of ethylene with the appropriate α-pyrone. Organic chemical literature describes the preparation of the α-pyrones and the methods that are useful for the production of aromatic substituted α-pyrones. The following references give detailed procedures for the preparation of α-pyrones: Kochetkov et al., J. Gen. Chem. USSR (English Translation) 26, 643 (1956), 27, 277 (1957), and 28, 1562 (1958) and 28, 2484 (1958) from acid chlorides; Wiley and Hart, J. Am. Chem. Soc. 76, 1942 (1959); Windholz et al., J. Org. Chem. 28, 1443 (1963); and Higgenbotham and Lapworth, J. Chem. Soc. 123, 1325 (1923). By the use of the above general processes with available starting materials or of the process described in Example 1 for the preparation of ethyl-6-pyridyl-α-pyrone-3-carboxylates, aromatic and substituted aromatic pyrones are easily produced. The usual general methods can be illustrated by the equations

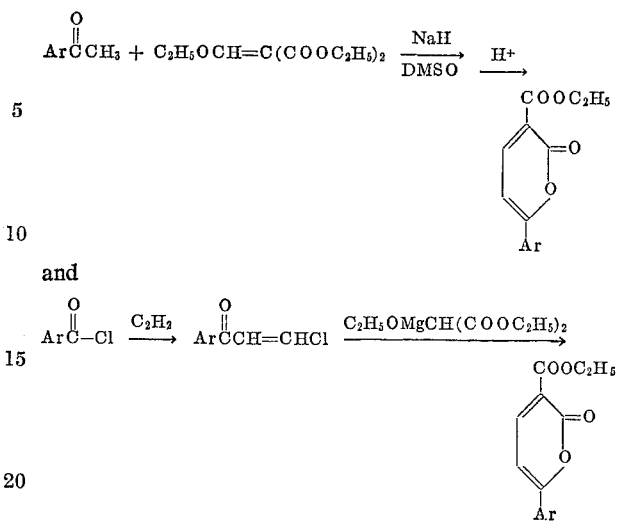

Exemplification of the usual general methods of preparing aromatic pyrones from aromatic methyl ketones, for example, acetophenone or 4-acetyl pyridine, may be found in Examples 1 and 3.

The above procedures start with readily available materials with Ar representing aromatic carbocyclic or heterocyclic monoradicals. The aromatic acid chlorides or methyl ketones are generally available or prepared from available compounds through conventional reactions.

Representative examples of suitable α-pyrones are:

ethyl 6-(p-tolyl)-α-pyrone-3-carboxylate
ethyl 6-(p-fluorophenyl)-α-pyrone-3-carboxylate
ethyl 6-(p-nitrophenyl)-α-pyrone-3-carboxylate
ethyl 6-(p-cyanophenyl)-α-pyrone-3-carboxylate
ethyl 6-(p-anisyl)-α-pyrone-3-carboxylate
ethyl 6-(m-bromophenyl)-α-pyrone-3-carboxylate
ethyl 6-(m-nitrophenyl)-α-pyrone-3-carboxylate
ethyl 6-(o-chlorophenyl)-α-pyrone-3-carboxylate
ethyl 6-(2,4-dinitrophenyl)-α-pyrone-3-carboxylate
ethyl 6-(2-pyridyl)-α-pyrone-3-carboxylate which can be in turn prepared by one of the above methods from:

p-methylacetophenone
p-fluorophenylbenzoyl chloride
p-nitrobenzoyl chloride
p-cyanoacetophenone
p-methoxyacetophenone
m-bromobenzoyl chloride
m-nitroacetophenone
o-chlorobenzoyl chloride
2,4-dinitrobenzoyl chloride
2-acetylpyridine The compounds of this invention are useful for the preparation of 4-aromatic-substituted bicyclo[2.2.2]octane-1-amines which are antidepressants.

The antidepressant activity of the 4-aromatic-substituted bicyclo[2.2.2]octane-1-amines can be shown by their ability to antagonize tetrabenzenazine-induced sedation in mice.

These bicycloamines can be prepared by reduction of the 4-aromatic bicyclo[2.2.2]oct-2-ene-1-carboxylic acids or their esters by a conventional platinum catalyzed hydrogenation to yield 4-arylbicyclo[2.2.2]octane-1-carboxylic acids or their esters followed by conversion of the carboxylic acid or ester group to an amino group by the Hofmann, Curtius or Schmidt reactions involving the conversion of the acid or ester group to an amide group and then to an amine group.

The conversion of the compounds of this invention to 4-arylbicyclo[2.2.2]octane-1-amines and the use of the bicyclooctaneamines as antidepressants has been described in greater detail in U.S. Pat. 3,308,160.

The embodiment of the invention in which an exclusive property or privilege is claimed are defined as follows:

1. A compound having the formula

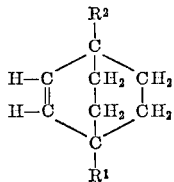

wherein one of $R^1$ or $R^2$ is selected from the group consisting of carboxy and lower alkoxycarbonyl and the other of $R^1$ or $R^2$ is phenyl or substituted phenyl with one or two substituents selected from the group consisting of lower alkyl, chlorine, bromine, fluorine, lower alkoxy, hydroxy, trifluoromethyl, cyano, nitro, carboxyl and lower alkoxycarbonyl; pyridyl or substituted pyridyl with one substituent selected from the group consisting of lower alkyl, chlorine, bromine, fluorine, trifluoromethyl, and lower alkoxy; or naphthyl or substituted naphthyl with one substituent selected from the lower alkyl, lower alkoxy, chlorine, and hydroxy.

2. A compound of claim 1 wherein one of $R^1$ or $R^2$ is ethoxycarbonyl and the other $R^1$ or $R^2$ is phenyl; said compound being: ethyl 4-phenylbicyclo[2.2.2]oct-2-ene-1-carboxylate.

3. A compound of claim 1 wherein one or $R^1$ or $R^2$ is ethoxycarbonyl and the other $R^1$ or $R^2$ is 4-pyridyl; said compound being: ethyl 4-(4-pyridyl)bicyclo[2.2.2]-oct-2-ene-1-carboxylate.

4. A compound of claim 1 wherein one of $R^1$ or $R^2$ is ethoxycarbonyl and other $R^1$ or $R^2$ is 4-methoxyphenyl; said compound being: ethyl-4-(4-methoxyphenyl)-bicyclo[2.2.2]-oct-2-ene-1-carboxylate.

5. A compound of claim 1 wherein one of $R^1$ or $R^2$ is carboxy and the other $R^1$ or $R^2$ is 4-methoxyphenyl; said compound being: 4-(4-methoxyphenyl)bicyclo[2.2.2]oct-2-ene-1-carboxylic acid.

6. A compound of claim 1 wherein one of $R^1$ or $R^2$ is carboxy and the other $R^1$ or $R^2$ is 4-ethoxyphenyl; said compound being: 4-(4-ethoxyphenyl)bicyclo[2.2.2]oct-2-ene-1-carboxylic acid.

7. A compound of claim 1 wherein one of $R^1$ or $R^2$ is carboxy and the other $R^1$ and $R^2$ is 4-hydroxyphenyl; said compound being: 4-(4-hydroxyphenyl)bicyclo[2.2.2]oct-2-ene-1-carboxylic acid.

8. A compound of claim 1 wherein one of $R^1$ or $R^2$ is methoxycarbonyl and the other $R^1$ or $R^2$ is 4-hydroxyphenyl; said compound being: methyl 4-(4-hydroxyphenyl)bicyclo[2.2.2]oct-2-ene-1-carboxylate.

9. A compound of claim 1 wherein one of $R^1$ or $R^2$ is methoxycarbonyl and the other $R^1$ or $R^2$ is 4-methoxyphenyl; said compound being: methyl 4-(4-methoxyphenyl)bicyclo[2.2.2]oct-2-ene-1-carboxylate.

10. A compound of claim 1 wherein one of $R^1$ or $R^2$ is methoxycarbonyl and the other $R^1$ or $R^2$ is 4-ethoxyphenyl; said compound being: methyl 4-(4-ethoxyphenyl)bicyclo[2.2.2]oct-2-ene-1-carboxylate.

11. A compound of claim 1 wherein one of $R^1$ or $R^2$ is ethoxycarbonyl and the other $R^1$ or $R^2$ is 4-ethoxyphenyl; said compound being: ethyl 4-(4-ethoxyphenyl)bicyclo[2.2.2]oct-2-ene-1-carboxylate.

12. The compound of claim 1 wherein one of $R^1$ or $R^2$ is ethoxycarbonyl and the other $R^1$ or $R^2$ is 4-hydroxyphenyl; said compound being: ethyl 4-(4-ethoxyphenyl)bicyclo[2.2.2]oct-2-ene-1-carboxylate.

13. The process for preparing a compound of claim 1 which comprises the steps of contacting at a pressure of 50–5000 atm. and at a temperature in the range of 100–300° C., at least a stoichiometric quantity of ethylene with an α-pyrone having the formula

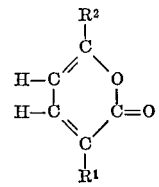

wherein $R^1$ and $R^2$ are as defined in claim 1.

14. The process of claim 13 wherein the pressure is in the range of 50–3000 atm.

15. The process of claim 13 wherein the pressure is in the range of 75–1000 atm. and the temperature is in the range of 125–275° C.

References Cited

UNITED STATES PATENTS

| 3,081,334 | 3/1963 | Kauer | 260—468 |
| 3,308,160 | 3/1967 | Snyder | 260—501.18 |

FOREIGN PATENTS

| 1,044,809 | 5/1959 | Germany | 260—471 |

HENRY R. JILES, Primary Examiner

S. D. WINTERS, Assistant Examiner

U.S. Cl. X.R.

260—465 D, 515 R, 471 R, 469, 520, 473 R, 343.5, 296 B, 570.5 R, 999, 484 P

CR 7031

PO-1050
(5/69)

UNITED STATES PATENT OFFICE
CERTIFICATE OF CORRECTION

Patent No. 3,631,054        Dated December 28, 1971

Inventor(s) James C. Kauer

It is certified that error appears in the above-identified patent and that said Letters Patent are hereby corrected as shown below:

Column 12, Claim 12, line 3, "ethoxyphenyl"

should be -- hydroxyphenyl --.

Signed and sealed this 27th day of June 1972.

(SEAL)
Attest:

EDWARD M. FLETCHER, JR.
Attesting Officer

ROBERT GOTTSCHALK
Commissioner of Patents